United States Patent
Lötscher

(10) Patent No.: US 8,590,384 B2
(45) Date of Patent: Nov. 26, 2013

(54) VIBRATION SENSOR ARRAY

(75) Inventor: Hugo Lötscher, Ballwil (CH)

(73) Assignee: Vonroll Infratec (Investment) AG, Zug (CH)

( * ) Notice: Subject to any disclaimer, the term of this patent is extended or adjusted under 35 U.S.C. 154(b) by 1214 days.

(21) Appl. No.: 12/295,499

(22) PCT Filed: Mar. 21, 2007

(86) PCT No.: PCT/EP2007/052687
§ 371 (c)(1),
(2), (4) Date: Nov. 6, 2008

(87) PCT Pub. No.: WO2007/115913
PCT Pub. Date: Oct. 18, 2007

(65) Prior Publication Data
US 2009/0044628 A1    Feb. 19, 2009

(30) Foreign Application Priority Data
Apr. 3, 2006    (CH) ..................................... 00546/06

(51) Int. Cl.
*G01H 1/12*    (2006.01)
(52) U.S. Cl.
CPC ....................................... *G01H 1/12* (2013.01)
USPC .................................. 73/661; 73/592; 73/649
(58) Field of Classification Search
USPC ............. 73/35.09–35.13, 584, 592, 649, 661, 73/866.5
See application file for complete search history.

(56) References Cited

U.S. PATENT DOCUMENTS

| | | | | |
|---|---|---|---|---|
| 2,799,788 A | * | 7/1957 | Fitzgerald et al. | 310/338 |
| 2,972,069 A | * | 2/1961 | Orr | 310/336 |
| 3,374,663 A | * | 3/1968 | Morris | 73/654 |
| 3,477,280 A | * | 11/1969 | Blackmer | 73/661 |
| 3,638,053 A | * | 1/1972 | Schenk et al. | 310/338 |
| 3,919,631 A | * | 11/1975 | Brown | 324/556 |
| 3,965,725 A | * | 6/1976 | Weber | 73/661 |
| 4,013,905 A | * | 3/1977 | Breneman et al. | 310/336 |

(Continued)

FOREIGN PATENT DOCUMENTS

JP    2006246690 A  *  9/2006

OTHER PUBLICATIONS

PE-Vibrophon Data sheet, Feb. 2011.
Ortomat, Flyer, Jun. 2004.

(Continued)

*Primary Examiner* — David A Rogers
(74) *Attorney, Agent, or Firm* — Notaro, Michalos & Zaccaria P.C.

(57) ABSTRACT

A vibration sensor arrangement (1) includes a vibrating mass (5) in permanent mechanical contact with a first side (3) of a piezoelectric element (2). The vibrating mass (5) includes a water-proof capsule (6) in which the piezoelectric element (2) is fixed. A dead weight (7) is in permanent mechanical contact with a second side (4) of the piezoelectric element (2) and is arranged in the water-proof capsule (6). A spring (8) is arranged between the dead weight (7) and the vibrating mass (5) and ensures permanent mechanical contact of the two masses (5,7) with the two sides (3,4) of the piezoelectric element (2). The vibration sensor arrangement (1) further includes first and second electric contacts (9,10) for picking up electric signals which are generated by the piezoelectric element (2) and for forwarding the signals to a recording device (11).

18 Claims, 2 Drawing Sheets

(56) References Cited

U.S. PATENT DOCUMENTS

Figure 1:
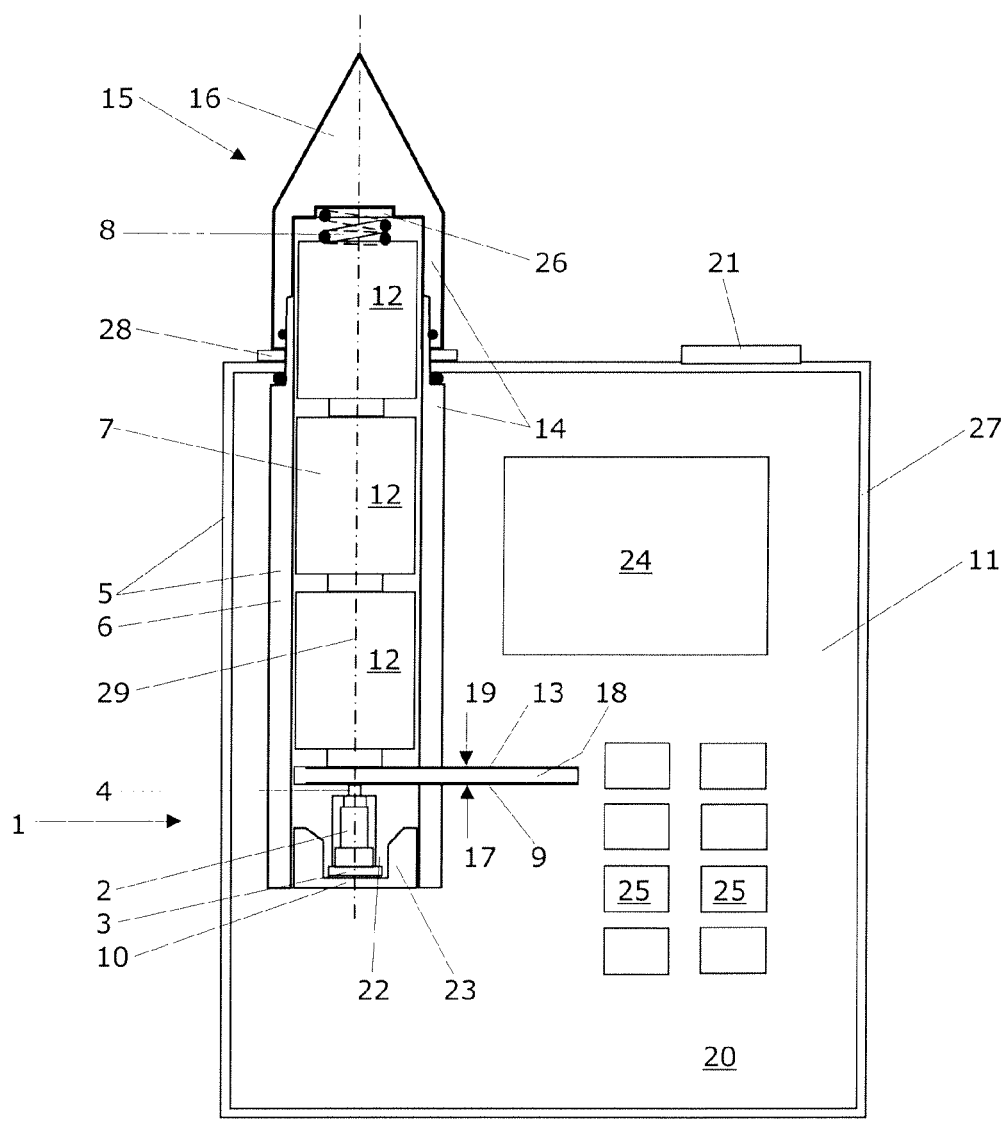

| | | | | |
|---|---|---|---|---|
| 4,315,428 | A * | 2/1982 | Stuivenwold et al. | 73/61.75 |
| 4,343,186 | A * | 8/1982 | Schnapp | 73/649 |
| 4,397,186 | A * | 8/1983 | Phelan et al. | 73/584 |
| 4,579,000 | A * | 4/1986 | Sudo | 73/654 |
| 4,585,608 | A * | 4/1986 | Day | 376/245 |
| 4,727,750 | A * | 3/1988 | Yonemura | 73/46 |
| 4,898,022 | A * | 2/1990 | Yumoto et al. | 73/46 |
| 4,991,439 | A * | 2/1991 | Betts | 73/587 |
| 5,024,095 | A * | 6/1991 | Warner | 73/661 |
| 5,103,165 | A * | 4/1992 | Sirattz | 324/133 |
| 5,379,643 | A * | 1/1995 | Taylor | 73/654 |
| 5,432,755 | A * | 7/1995 | Komninos | 367/135 |
| 5,672,929 | A * | 9/1997 | Gutsell et al. | 310/319 |
| 5,798,488 | A * | 8/1998 | Beresford et al. | 181/102 |
| 5,943,634 | A * | 8/1999 | Piety et al. | 702/56 |
| 5,945,603 | A * | 8/1999 | Shih | 73/652 |
| 5,965,819 | A * | 10/1999 | Piety et al. | 73/660 |
| 6,078,874 | A * | 6/2000 | Piety et al. | 702/122 |
| 6,079,275 | A * | 6/2000 | Komninos | 73/661 |
| 6,208,944 | B1 * | 3/2001 | Franke et al. | 702/56 |
| 6,386,036 | B1 * | 5/2002 | Borza | 73/574 |
| 6,477,908 | B1 * | 11/2002 | Wakui | 73/866.5 |
| 6,490,930 | B1 * | 12/2002 | Ohkubo et al. | 73/661 |
| 6,672,168 | B2 * | 1/2004 | Higgins | 73/660 |
| 2002/0000126 | A1 * | 1/2002 | Barclay | 73/649 |
| 2005/0066736 | A1 * | 3/2005 | Ohbayashi et al. | 73/649 |
| 2006/0236771 | A1 * | 10/2006 | Lin | 73/649 |
| 2007/0256500 | A1 * | 11/2007 | Vornbrock et al. | 73/649 |
| 2008/0105056 | A1 * | 5/2008 | Popescu et al. | 73/649 |
| 2008/0314155 | A1 * | 12/2008 | Blackmon et al. | 73/649 |

OTHER PUBLICATIONS

Ortomat-LC, Flyer, Jun. 2004.
Ortomat-MT, Flyer, Jun. 2004.
LOG 2000, Flyer, 1998.
LOG3000, Flyer, Mar. 2002.
LOG1A, Flyer, Mar. 2004.
LeakPEN, Flyer, Mar. 2002.
Water leakage detectos and -systems, LOG 1-The water leakage detector, WAGAMET Gas & Wassertechnologie 2004.
In-Service Monitoring System for Pressurized Pipelines: Leak PEN System, WAGAMET Gas & Wassertechnologie, 2011.
Photograpic Image LeakPEN - 2011.
Technical Datasheet—PE-Vibrophon, WAGAMET 2011.

* cited by examiner

VIBRATION SENSOR ARRAY

The present invention relates to a vibration sensor arrangement as disclosed herein.

Generic vibration sensor arrangements and the recording, evaluation and display devices required for this purpose have been distributed for many years by the applicant under the name VIBRAFON. Vibraphones are components of the systems ORTOMAT®, LOG2000, LOG3000, LOG1 and LECK-PEN, in a simplified version. Such vibration sensor arrangements comprise a rod-shaped piezoelectric element with two mutually opposite end caps, a vibrating mass which is in permanent mechanical contact with the first end cap of the piezoelectric element, with said vibrating mass comprising a water-tight capsule in which the piezoelectric element is fixed, a dead weight which is in permanent mechanical contact with a second end cap of the piezoelectric element and which is arranged in said water-tight capsule, a spring which is arranged between the dead weight and the vibrating mass and which ensures the permanent mechanical contact of the two masses with the two end caps of the piezoelectric element, such that it presses these two masses constantly against the two end caps of the piezoelectric element, electric contacts for tapping electric signals which are generated by this piezoelectric element according to pressure fluctuations caused by the vibrating mass in the same, and a recording device which is connected with the electric contacts and which is arranged for recording the electric signals generated by the piezoelectric element.

Such vibration sensor arrangements are installed as a standard in hydrants of water supply networks as leakage detectors, with the recording device comprising an electronic system with a microprocessor and memory and being connected with the electric contacts. The recording device is preferably designed as a data logger and can transmit the data recorded by the data logger via an infrared interface (cf. DE 197 57 581 A1) or a radio antenna to a receiving device. The transmitted data are collected and preferably evaluated and displayed centrally.

It was the object of the invention to provide an alternative and portable vibration sensor arrangement which supplies measurement data which are comparable to the installed leakage sensors.

This object is achieved by the features of claim 1 in such a way that an initially defined generic vibration sensor arrangement, according to the preamble, is further developed in accordance with the invention in such a way that is embodied in a portable way. The vibration sensor arrangement in accordance with the invention is especially characterized in that the water-tight capsule and the dead weight are arranged as a power supply for said recording device, such that said dead weight comprises at least one electric battery for the operation of said recording device, with said at least one electric battery being connected or connectable via electric leads with said recording device. Preferred and further inventive features of said vibration sensor arrangement are obtained from the dependent claims.

Figure 2:
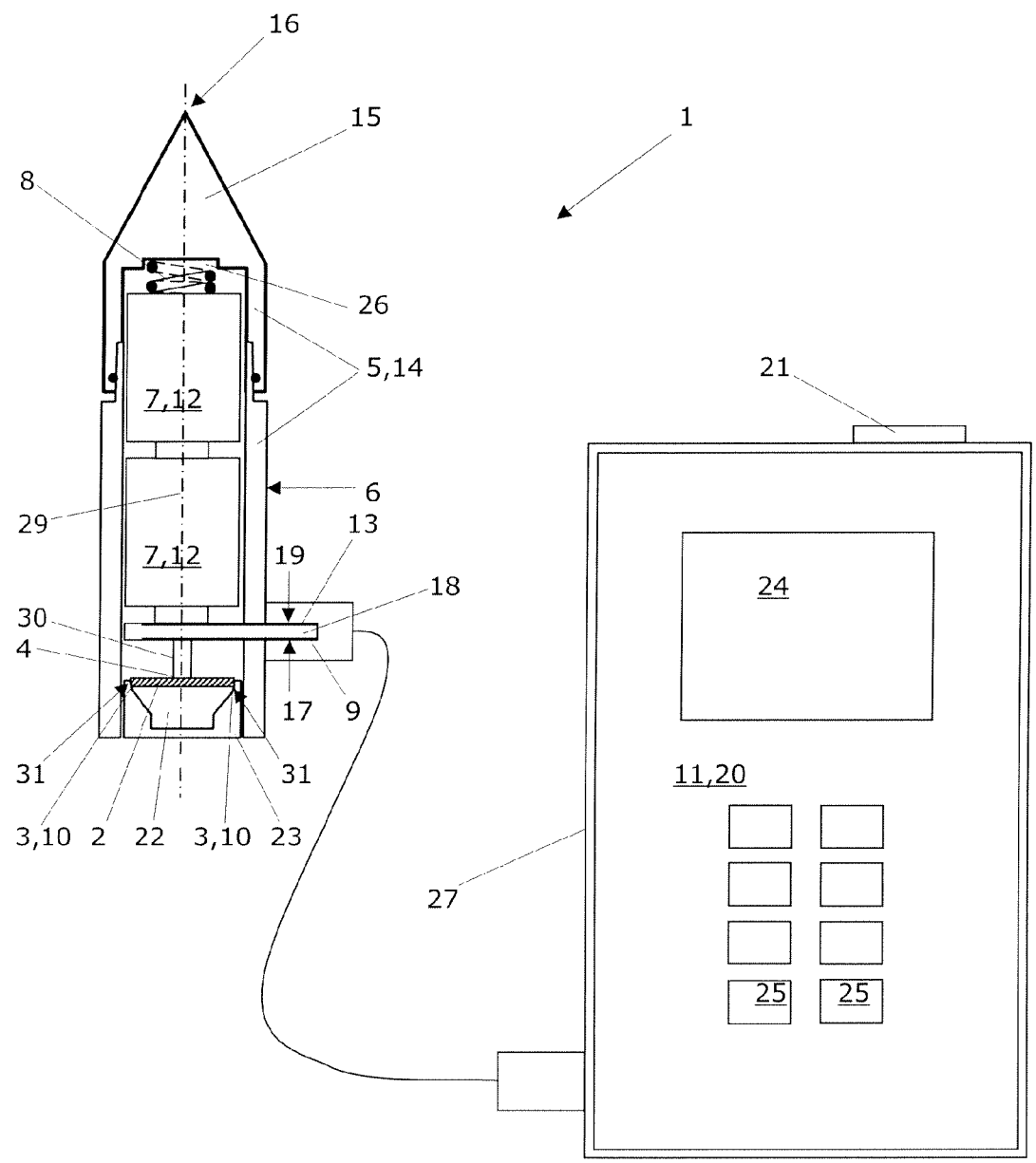

The oscillation sensor arrangement in accordance with the invention is now explained in closer detail by means of schematic drawings, which do not limit the scope of the invention in any way, by reference to exemplary preferred embodiments, wherein it shows:

FIG. 1 a partial sectional view through a vibration sensor arrangement in accordance with the invention according to a first embodiment;

FIG. 2 a partial sectional view through a vibration sensor arrangement in accordance with the invention according to a second embodiment.

FIG. 1 shows a partial sectional view through a vibration sensor arrangement 1 in accordance with the invention according to a first embodiment. A preferably rod-like piezoelectric element 2 with two mutually opposite sides 3, 4 which are arranged as end caps are disposed in a water-proof capsule 6 which is arranged as a vibrating mass 5 and is permanently in mechanical contact with a first side 3 or the end cap of the piezoelectric element 2. The piezoelectric element 2 is fixed in said capsule 6. Preferably, the piezoelectric element 2 is disposed in a recess 22 of a sealing element 23 which approximately matches the external shape of the piezoelectric element 2 and is installed in a sealing and mechanically fixed way in the capsule 6.

This installation is preferably achieved by gluing, pressing, screwing or any other combination of these possibilities. As a result, the rod-like piezoelectric element 2 is fixed in the capsule 6 and thus also in the vibrating mass 5.

A dead weight 7 is arranged in said water-proof capsule 6 and is in permanent mechanical contact with a second side 4 or the end cap of the piezoelectric element 2. A spring 8 is arranged between the dead weight 7 and the vibrating mass 5 and presses these two masses 5, 7 constantly against the two sides 3, 4 or end caps of the piezoelectric element 2. The spring force of said spring 8 is chosen to be so large that none of these two masses 5, 7 will lift off from the piezoelectric element 2 in the case of maximum vibrations to be measured. Said spring 8 thus ensures a permanent mechanical contact of the two masses 5, 7 with the two sides 3, 4 or the end caps of the piezoelectric element 2.

Electric contacts 9, 10 will pick up the electric signals which are generated by this rod-like piezoelectric element 2, according to the pressure fluctuations caused via the vibrating mass 5 in the same. Rod-like piezoelectric elements and piezoelectric stacks are known to the person skilled in the art from the state of the art.

A recording device 11 records the electric signals generated by the piezoelectric element 2, such that the same converts them into storable and/or displayable digital data. The recording device preferably comprises an electronic system with a microprocessor and a memory and is connected with the electric contacts 9, 10.

The water-proof capsule 6 and the dead weight 7 are arranged in accordance with the invention as a power supply for said recording device 11, such that said dead weight 7 comprises at least one electric battery 12 for the operation of said recording device 11. This at least one electric battery 12 is connected via electric leads 13, 14 with said recording device 11. The entire dead weight, which means the so-called "reference mass", is formed of several electric batteries, which means as many as possible, so that the portable vibration sensor arrangement 1 has a maximum reference mass at minimum total weight and is provided at the same time with the largest possible electric autonomy. It is also possible however to fill the space of the battery compartment with a metal "dummy" for example, so that a preferred battery voltage at an even larger reference mass is enabled.

The vibration sensor arrangement 1 is embodied in a portable way. It is preferably partly (as shown in FIG. 1) installed in the recording device 11 in such a way that the vibrating mass 5 also includes said recording device 11. It is especially preferable in this respect that the water-proof capsule 6 comprises a sensor end 15 which is arranged outside of the recording device 11 which is preferably also arranged in a water-proof manner. A lock nut 28 fixes the water-proof capsule 6 in a preferred manner to the housing 27 of the recording device 11. Said recording device is preferably compiled in such a way that screwed parts clamp a seal between themselves. The display 24 for reading the measurement values and setting and operating parameters and the keys 25 for operating the recording device 11 are preferably covered with a water-proof film. It is especially preferred that the portable vibration sensor arrangement 1 is arranged in its entirety completely water-proof (with recording device and battery/vibration sensor capsule).

The sensor end 15 is preferably arranged as a screw cap for the water-proof capsule 6 that receives the electric batteries. Moreover, the sensor end 15 preferably comprises an inner recess 26 which centers the spring 8. This screw cap preferably comprises a conical tip 16, so that vibrations on pipe elements, fittings or hydrants of water distribution networks can be scanned and picked up in a purposeful way. The use of the vibration sensor arrangement 1 as a measuring device for detecting oscillations which are caused by leakages in other fluid lines (e.g. gas lines) or damage to bearings of transport means and machines is promoted by such a conical-tip-like sensor end 15. It can also be provided to arrange the sensor end 15 in a pyramidal, helical or partly flat way (e.g. as a truncated cone or truncated pyramid) when special fields of application for detecting oscillations necessitate this. In particular, several sensor ends 15 with individual shaping which are arranged as screw caps can form an assortment that belongs to a vibration sensor arrangement 1.

The water-proof capsule 6 is made of a material which is suitable based on its physical properties to transmit vibrations. This material should conduct vibrations without possibly influencing them and/or being subject to damage itself. The water-tight capsule 6 preferably comprises an electrically conductive material which can assume the function of a conductor for making electric contact with the electric batteries 12 and/or the piezoelectric element 2.

In order to fulfill these two demands, the water-tight capsule 6 can be made of an electrically conductive, high-strength plastic. It has the advantage that the weight of the vibrating mass 5, which includes said water-proof capsule 6, can additionally be reduced. Instead of an electrically conductive, high-strength plastic, it is also possible to use a non-conductive plastic when this is permitted by its physical properties, and when the function of a conductor for making electric contact with the electric batteries 12 and/or the piezoelectric element 2 is assumed by another electric conductor such as an electrically conductive, at least partial surface coating or by respectively laid wires. The arrangement of the water-proof capsule from a metal is preferable, so that the electric conductance is ensured via the capsule wall. Especially preferred are light metals or light metal alloys because they will also allow minimizing the weight of the vibrating mass. Metals are further preferable which have a chemically resistive surface (be this by a respective coating or by oxidation such as in the case of aluminum).

The water-proof capsule 6 is preferably made of an electrically conductive plastic or a metal. A brass alloy has proven to be a suitable metal for example. The water-proof capsule 6 preferably further comprises at least one O-ring or another ring-like seal for connecting in a tight manner screwed and releasable parts of said water-proof capsule 6.

The electric contact 9 of the vibration sensor arrangement 1 is preferably arranged on the first side 17 of printed circuit board 18. Moreover, it is also preferable that the electric conductor 13 is arranged on the second side 19 of the printed circuit board 18. This special printed circuit board 18 is arranged between the piezoelectric element 2 and at least one electric battery 12 in such a way that the second side 4 or the end cap of the piezoelectric element 2 makes contact with the electric contact 9 and a first pole of the electric battery 12 with the electric conductor 13. The electric contact 9 and the electric conductor 13 are electrically insulated against the electrically conductive components of capsule 6. The plus pole is especially preferable of said first pole of the at least one electric battery 12, because it represents an elevated contact in preferably used conventional electric batteries which can be brought into contact easily with the electric conductor 13. Said first pole (not shown) can alternatively also be the minus pole. It is then preferable however that the electric conductor 13 has an enlargement or elevation which can securely make contact with said minus pole.

Conventional alkali batteries such as those of type A, AA or AAA can be used as electric batteries. However, the use of lithium batteries is preferable due to their longer life. Specially preferred are rechargeable batteries or rechargeable batteries with lithium ions.

An especially preferred vibration sensor arrangement 1 is characterized in that the printed circuit board 18 is mounted under mechanical pretension, so that it exerts a constant pressure on the second side 4 or the end cap of the piezoelectric element 2. This ensures an especially securely fixed position of the piezoelectric element 2 in the sealing element 23. In addition, the piezoelectric element is preferably partly cast into a stabilizing insulation material which provides the piezoelectric element 2 with improved stability or durability without negatively influencing its sensitivity for detecting vibrations. Preferably, the piezoelectric element 2 is cast into nylon. The wall of the water-proof capsule 6 is arranged in an electrically conductive way and forms the electric contact 10 to the piezoelectric element 2 and the electric conductor 14 to the other pole of the electric battery 12 of this vibration sensor arrangement 1.

Preferably, this recording device 11 is also arranged as an evaluation and display device for evaluating and displaying itself the results resulting from the electric signals generated by the piezoelectric element 2 and comprises for this purpose a display 24 for displaying individual values or even progression curves of such values.

The vibration sensor arrangement 1 in accordance with the invention can consist of a single device (as shown in FIG. 1) which comprises a housing 27 with the recording, evaluating and display device and a fixedly installed sensor/battery compartment in the form of the water-proof capsule 6. Such a device is preferably arranged in a water-proof way in order to ensure its function even in the case of high air humidity or rain weather, or even when subjected to splash water.

However, the sensor/battery compartment can also be arranged movable relative to the housing of the recording, evaluating and display device and be arranged outside of the same and be connected with the same merely via the contacts 9, 10 and the electric conductors 13, 14 (cf. FIG. 2). Such an alternative or second embodiment could advantageously be used in locations where the best place for picking up the vibrations is difficult to access, so that either the keys 25 or the display 24 of a combined recording, evaluating and display device with built-in sensor/battery compartment is not visible or is not readable. In such a case, each of the two flexible parts which are connected with each other, the recording, evaluating and display device and the sensor/battery compartment are each arranged in a water-proof way. The connection between these two parts can also be provided with a plug-in configuration. In contrast to the first embodiment (cf. FIG. 1), the piezoelectric element 2 is arranged as a membrane according to the second embodiment as shown in FIG. 2. This effectively concerns a rod/membrane combination, with the rod 30 being arranged as an electric or mechanical conductor (cf. FIG. 2) or also as an additional piezoelectric element. The piezoelectric membrane which is used here alternatively to a rod-like piezoelectric element is preferably arranged perpendicular to the capsule axis 29. The fixing of the periphery 31 of such a piezoelectric membrane is especially preferably made to the sealing element 23 which is installed in a sealed and mechanically fastened way to the capsule 6. Rod 30 is arranged here on the second side of the piezoelectric membrane and preferably in its center. Said rod 30 is preferably fixed either to the piezoelectric membrane or to the first side 17 of the printed circuit board 18. As is shown in FIG. 2, the sealing element 23 is preferably provided with a wide or funnel-like recess in order to provide the piezoelectric membrane with the largest possible mobility. Piezoelectric membranes and piezoelectric membrane stacks which generate electric signals according to their fluctuations in deflection caused by a vibrating mass are known to the person skilled in the art from the state of the art.

This recording, evaluating and display device of the vibration sensor arrangement 1 is arranged especially preferably as a multifunctional measuring device 20, with said multifunctional measuring device 20 having at least one plug-connection and a digital 1Wire® bus (1-Wire® is a registered trademark of Dallas Semiconductor Corp., USA) for connecting the respective 1Wire® measuring probes corresponding to the fields of application. This 1Wire® bus uses only two wires which can provide power supply to the device and can transmit digital data in both directions. Due to this technology, a virtually unlimited number of 1Wire® measuring probes can be connected to a single 1Wire® bus. All possible 1Wire® measuring probes can be used with this multifunctional measuring device 20 because it comprises at least one plug-in connection 21 and the processor of this multifunctional measuring device 20 will automatically recognize any 1Wire® measuring probe when a key 25 designated with "ON" is pressed for switching on the device. A measurement value corresponding to the coupled sensor is immediately displayed on the display 24. All measurements can be taken accordingly from the logger and be evaluated and displayed without requiring the multifunctional measuring device 20 to be additionally connected to a personal computer or any other computer. This is enabled in such a way that all sensors are chipped. A so-called "flash RAM chip" with an individual unique code will identify each sensor or 1Wire® measuring probe and will also store the individual calibration values of the sensors. This ensures advantageously that only the sensors need to be sent to a central location for renewed calibration, but not the entire multifunctional measuring device 20. A calibrated sensor or calibrated 1Wire® measuring probe can be inserted into any desired multifunctional measuring device 20. This multifunctional measuring device 20 will then take the current calibration values from the "chip" of the sensor and will store it on the "flash RAM chip". The internal circuitry of this multifunctional measuring device 20 is preferably arranged in a self-calibrating way.

This multifunctional measuring device 20 preferably comprises software which is loaded into the processor and which enables multilanguage menu guidance and logging function for recording all measurements of the connectable sensor types.

Typical fields of application for such multifunctional measuring devices 20 are:

The detection of vibrations, and
the detection of combustible gases, and/or
the measurement of pressure values, and/or
the measurement of temperature values, and/or
the measurement of flow rate values, and/or
the measurement of humidity values.

The main use of the multifunctional measuring device 20 is aimed at detecting vibrations which are caused by leakages in fluid lines or storage defects of means of transportation and machines. It is known that leakages in fluid lines (such as water lines or gas lines) can be determined and localized by means of acoustic detection of the noises or vibrations causes by the leaking fluid (e.g. DE 197 57 581 A1 or EP 1 052 492 A1). In actual fact, the same measurement values are obtained in using the multifunctional measuring device 20 in accordance with the invention as with the permanently installed detectors of the ORTOMAT system. The measurement of oscillations or vibrations in bearings of means of transport and machines comprises checking wheel bearings in automobiles, railway carriages and other means of transport. Shafts of bearings of drives in or on such means of transport can also be checked for vibrations, so that damage to bearings can be detected at an early stage and respective failures or accidents can be avoided. The multifunctional measuring device 20 in accordance with the invention can be used to detect vibrations with very small deflections of approx. 1 µm for example which lie beneath the audibility threshold of the human ear. Such vibrations can be detected with the vibration sensor arrangement 1 or with the multifunctional measuring device 20 and can be stored in the data logger and/or can be made audible directly in a headphone. Said headphone is preferably connected in a cordless manner with the vibration sensor arrangement 1 or the multifunctional measuring device 20.

Pressure sensors for all measuring areas and with different measurement precision can be connected to the multifunctional measuring device 20, with the temperature of the medium being determined at the same time. Digital temperature sensors and resistance thermometers of type Pt 1000 measure the temperature with a precision of up to 0.1° C.

Gas sensors for methane and other combustible gases are heated, with the lithium batteries of the multifunctional measuring device 20 enabling an operating time of up to 40 hours (with alkali batteries approx. 20 hours).

The number of the flowmeters that can be connected to the multifunctional measuring device 20 and many further impulse sensing elements is only limited by practical use because the multifunctional measuring device 20 is extendable at will via the 1Wire® bus.

For the measurement of humidity, the multifunctional measuring device 20 supports all 4 to 20 mA analogue sources, with the maximum feed voltage of the 4 to 20 mA bus being 5 V. For extremely long assignments of the multifunctional measuring device 20 it is recommended to use an external power supply which is connected separately to the device or can be connected to the sensor/battery compartment of the water-proof capsule 6 (not shown).

All reference numerals designate respective parts in the figures, even when they are not described in detail in every single case. Any random combination of elements of the illustrated and described embodiments shall belong to the scope of the present invention.

REFERENCE NUMERALS

1 Vibration sensor arrangement
2 Piezoelectric element
3 First side
4 Second side
5 Vibrating mass
6 Water-proof capsule 7 Dead weight
8 Spring
9, 10 Electric contact
11 Recording device
12 Battery
13 Electric conductor
14 Electric conductor
15 Sensor end
16 Conical tip
17 First side of printed circuit board
18 Printed circuit board
19 Second side of printed circuit board
20 Multifunctional measuring device
21 Plug-in connection
22 Recess
23 Sealing element
24 Display
25 Keys
26 Inner recess
27 Housing
28 Lock nut
29 Capsule axis
30 Rod
31 Periphery

The invention claimed is:

1. A vibration sensor arrangement (1), comprising:
   (a) a piezoelectric element (2) with a first side (3) and a second side (4);
   (b) a vibrating mass (5) which is in permanent mechanical contact with the first side (3) of the piezoelectric element (2), said vibrating mass (5) comprising a water-proof capsule (6) in which the piezoelectric element (2) is fixed;
   (c) a dead weight (7) which is in permanent mechanical contact with a second side (4) of the piezoelectric element (2) and which is arranged in said water-proof capsule (6);
   (d) a spring (8) which is arranged between the dead weight (7) and the vibrating mass (5) and which ensures the permanent mechanical contact of the two masses (5,7) with the two sides (3,4) of the piezoelectric element (2), such that it presses the two masses (5,7) constantly against the two sides (3,4) of the piezoelectric element (2); and
   (e) first and second electric contacts (9,10) for picking up electric signals which are generated by said piezoelectric element (2) and for forwarding said signals to a recording device (11) which is or can be connected with the electric contacts (9,10) and which is arranged for recording the electric signals generated by the piezoelectric element (2), the first electric contact (9) having an insulation layer on its backside, being arranged between the piezoelectric element (2) and the dead weight (7), and providing the mechanical contact between the dead weight (7) and the piezoelectric element (2),
   wherein the vibration sensor arrangement (1) is embodied in a portable way, and wherein the dead weight (7) inside the water-proof capsule (6) comprises at least one electric battery (12) such that said dead weight (7) is arranged as a power supply for the operation of said recording device (11), said at least one electric battery (12) being connected or connectable via electric conductors (13,14) with said recording device (11).

2. The vibration sensor arrangement (1) of claim 1, wherein the piezoelectric element (2) is a rod-shaped piezoelectric element or a piezoelectric stack, the first side (3) and the second side (4) being arranged as an end cap with said piezoelectric element (2) generating electric signals according to the pressure fluctuations caused in the same by the vibrating mass (5).

3. The vibration sensor arrangement (1) of claim 2, wherein the electric contact (9) is arranged at a first side (17) of a printed circuit board (18) and the electric conductor (13) is arranged on a second side (19) of the printed circuit board (18), said printed circuit board (18) being arranged between the piezoelectric element (2) and the at least one electric battery (12) in such a way that the second end cap or side (4) of the piezoelectric element (2) makes contact with the electric contact (9) and a first pole of the least one electric battery (12) makes contact with the electric conductor (13).

4. The vibration sensor arrangement (1) of claim 3, wherein the printed circuit board (18) is mounted mechanically prestressed, so that it exerts a constant pressure on the second side (4) of the piezoelectric element (2).

5. The vibration sensor arrangement (1) of claim 3, wherein the rod-shaped piezoelectric element (2) is partly cast into an insulation material which stabilizes the same.

6. The vibration sensor arrangement (1) of claim 3, wherein the water-proof capsule (6) has a wall that is arranged in an electrically conductive way and forms the electric contact (10) to the piezoelectric element (2) and also forms the electric conductor (14) to the other pole of the at least one electric battery (12).

7. The vibration sensor arrangement (1) of claim 1, wherein the piezoelectric element (2) is a piezoelectric membrane or a piezoelectric membrane stack, having a first side (3) arranged as a periphery (31) and a second side (30) subjected to the actions of a rod (30), with said piezoelectric element (2) generating electric signals according to the deflection fluctuations caused by the vibrating mass (5) in the same.

8. The vibration sensor arrangement (1) of claim 4, wherein the electric contact (9) is arranged on a first side (17) of a printed circuit board (18) and the electric conductor (13) is arranged on a second side (19) of the printed circuit board (18), said printed circuit board (18) being arranged in such a way between the rod (30) and the at least one electric battery (12) that the second side (4) of the piezoelectric element (2) makes contact with the electric contact (9) and a first pole of the least one electric battery (12) makes contact with the electric conductor (13).

9. The vibration sensor arrangement (1) of claim 8, wherein the printed circuit board (18) is mounted mechanically prestressed, so that it exerts a constant pressure on the second side (4) of the piezoelectric element (2).

10. The vibration sensor arrangement (1) of claim 1, wherein the vibration sensor arrangement (1) is partly installed in the recording device (11) in such a way that the vibrating mass (5) co-includes said recording device (11), with the water-proof capsule (6) comprising a sensor end (15) which is arranged outside of the recording device (11).

11. The vibration sensor arrangement (1) of claim 10, wherein the sensor end (15) is arranged as a screw cap for the water-proof capsule (6) which receives the electric batteries, said screw cap having a conical tip (16) for the purposeful scanning or detection of vibrations.

12. The vibration sensor arrangement (1) of claim 1, wherein the vibration sensor arrangement (1) is arranged outside of the recording device, is arranged movably relative to the same, and is connected to the same via merely the contacts (9,10) and the electric conductors (13,14), with the water-proof capsule (6) comprising a sensor end (15).

13. The vibration sensor arrangement (1) of claim 12, wherein the sensor end (15) is arranged as a screw cap for the water-proof capsule (6) which receives the electric batteries, said screw cap having a conical tip (16) for the purposeful scanning or detection of vibrations.

14. The sensor arrangement (1) of claim 1, wherein the water-proof capsule (6) comprises suitable materials for transmitting vibrations and for conducting electric current or electric signals.

15. The vibration sensor arrangement (1) of claim 14, wherein the water-proof capsule (6) is made of an electrically conductive plastic material or a metal and comprises at least one O-ring for connecting in a sealing manner screwed parts of the same.

16. The vibration sensor arrangement (1) of claim 1, wherein this recording device (11) is also arranged as an evaluating and display device for evaluating and displaying results arising from electric signals generated by the piezo-electric element (2).

17. The vibration sensor arrangement (1) of claim 16, wherein this recording, evaluating and display device is arranged as a multifunctional measuring device (20) whose area of application comprises the detection of vibrations and at least one of the following fields of application: the detection of combustible gases, the measurement of pressure, temperature, flow-rate and humidity values, with said multifunctional measuring device (20) comprising at least one plug-in connection (21) and a digital bus for connecting probes corresponding to the fields of application.

18. A method of using of the vibration sensor arrangement (1) of claim 17 for detecting oscillation or vibrations, and for measuring at least one of pressure, temperature, flow-rate, and humidity values.

\* \* \* \* \*